United States Patent
Cheng

(10) Patent No.: US 11,374,931 B2
(45) Date of Patent: Jun. 28, 2022

(54) SYSTEM AND METHOD FOR INFORMATION INTERACTION

(71) Applicant: BOE TECHNOLOGY GROUP CO., LTD., Beijing (CN)

(72) Inventor: Xinyi Cheng, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 252 days.

(21) Appl. No.: 16/441,556

(22) Filed: Jun. 14, 2019

(65) Prior Publication Data

US 2020/0036711 A1 Jan. 30, 2020

(30) Foreign Application Priority Data

Jul. 27, 2018 (CN) .......................... 201810842610.4

(51) Int. Cl.
*H04L 9/40* (2022.01)
*G06K 7/14* (2006.01)

(52) U.S. Cl.
CPC ........ *H04L 63/0876* (2013.01); *G06K 7/1417* (2013.01); *H04L 63/10* (2013.01)

(58) Field of Classification Search
CPC .............. H04L 63/0876; H04L 63/10; H04L 63/0853; H04L 63/0823; H04L 9/3234; G06K 7/1417

(Continued)

(56) References Cited

U.S. PATENT DOCUMENTS

| 7,551,088 B2 | 6/2009 | Findlay et al. |
| 7,634,802 B2* | 12/2009 | Chiloyan ............ H04W 12/084 713/168 |
| 8,627,438 B1* | 1/2014 | Bhimanaik ............ H04L 63/08 726/9 |

(Continued)

FOREIGN PATENT DOCUMENTS

| CN | 203435015 | 2/2014 |
| CN | 103647634 A | 3/2014 |

(Continued)

OTHER PUBLICATIONS

1st Office Action dated Sep. 1, 2020 for Chinese Patent Application No. 201810842610.4.

*Primary Examiner* — Kambiz Zand
*Assistant Examiner* — Mahabub S Ahmed
(74) *Attorney, Agent, or Firm* — Thomas | Horstemeyer LLP

(57) ABSTRACT

A system for information interaction includes: an electronic tag configured to present a two-dimensional code; a binding relationship existing between a first terminal and the two-dimensional code; a second terminal configured to: scan the two-dimensional code, generate login request information, send the login request information to the information interaction platform, the login request information including identifier information of the second terminal; receive content presentation information corresponding to the two-dimensional code returned by the information interaction platform, according to the identifier information, and perform information interaction with the first terminal according to a communication manner selected from the content presentation information; and an information interaction platform configured to receive the login request information, authorize and authenticate the second terminal according to the identifier information, and send the content presentation (Continued)

information to the second terminal according to authorization and authentication results.

20 Claims, 5 Drawing Sheets

(58) Field of Classification Search
USPC .......................................................... 726/4
See application file for complete search history.

(56) References Cited

U.S. PATENT DOCUMENTS

| | | | | |
|---|---|---|---|---|
| 10,104,515 | B1* | 10/2018 | Graves | H04L 67/2804 |
| 11,132,425 | B1* | 9/2021 | Cohen | G06Q 20/4093 |
| 2009/0028101 | A1* | 1/2009 | Kakumaru | H04W 12/08 370/329 |
| 2009/0187492 | A1* | 7/2009 | Hammad | G06Q 30/00 705/26.1 |
| 2010/0070759 | A1* | 3/2010 | Leon Cobos | H04L 63/18 713/176 |
| 2010/0241857 | A1* | 9/2010 | Okude | H04L 9/3226 713/168 |
| 2012/0110646 | A1* | 5/2012 | Ajitomi | G06F 21/335 726/4 |
| 2013/0068837 | A1* | 3/2013 | Dollard | G06Q 20/3276 235/380 |
| 2013/0124855 | A1* | 5/2013 | Varadarajan | G06Q 20/40 726/4 |
| 2013/0167208 | A1* | 6/2013 | Shi | H04L 63/08 726/5 |
| 2013/0173915 | A1* | 7/2013 | Haulund | H04L 63/18 713/155 |
| 2013/0219479 | A1* | 8/2013 | DeSoto | G06Q 20/202 726/6 |
| 2014/0019768 | A1* | 1/2014 | Pineau | H04L 9/3231 713/186 |
| 2014/0040628 | A1* | 2/2014 | Fort | G09C 5/00 713/182 |
| 2014/0082703 | A1* | 3/2014 | Zhang | H04L 63/10 726/4 |
| 2014/0132393 | A1* | 5/2014 | Evans | G08B 21/02 340/6.11 |
| 2014/0136652 | A1* | 5/2014 | Narayanaswami | H04W 4/80 709/217 |
| 2014/0173695 | A1* | 6/2014 | Valdivia | G06F 21/33 726/4 |
| 2014/0197232 | A1* | 7/2014 | Birkler | H04L 63/08 235/375 |
| 2015/0227855 | A1* | 8/2015 | Hanashima | G06Q 10/02 705/5 |
| 2015/0230760 | A1* | 8/2015 | Schneider | A61M 5/172 600/300 |
| 2015/0271098 | A1* | 9/2015 | Somadder | H04L 67/42 709/225 |
| 2015/0295921 | A1* | 10/2015 | Cao | H04L 9/3226 726/7 |
| 2015/0326565 | A1* | 11/2015 | Kuang | G06F 21/34 726/4 |
| 2016/0042352 | A1* | 2/2016 | Motoki | G06Q 20/382 235/380 |
| 2016/0147990 | A1* | 5/2016 | Schneider | G06F 21/44 726/19 |
| 2016/0189147 | A1* | 6/2016 | Vanczak | G06Q 20/3829 705/71 |
| 2017/0019396 | A1* | 1/2017 | Bettenburg | H04L 63/083 |
| 2017/0142460 | A1* | 5/2017 | Yang | G06K 19/14 |
| 2017/0161670 | A1* | 6/2017 | Ng | G06Q 10/063114 |
| 2017/0193479 | A1* | 7/2017 | Kamat | G06Q 20/3276 |
| 2017/0351994 | A1* | 12/2017 | Waris | G06Q 10/08355 |
| 2018/0027354 | A1* | 1/2018 | Regep | H04W 12/03 455/418 |
| 2018/0075229 | A1* | 3/2018 | Jan | G06F 21/35 |
| 2018/0183805 | A1* | 6/2018 | Gonzalez Corona | G06Q 20/401 |
| 2018/0219864 | A1* | 8/2018 | Hu | H04L 63/08 |
| 2018/0247070 | A1* | 8/2018 | Evans | G08B 25/12 |
| 2018/0288037 | A1* | 10/2018 | Yang | G06K 7/1095 |
| 2018/0300981 | A1* | 10/2018 | Gaur | G07F 9/001 |
| 2018/0332471 | A1* | 11/2018 | Zhu | H04W 12/06 |
| 2019/0028581 | A1* | 1/2019 | Zheng | H04L 67/10 |
| 2019/0222420 | A1* | 7/2019 | Maezawa | H04L 9/083 |
| 2019/0246273 | A1* | 8/2019 | Zhou | H04B 11/00 |
| 2019/0268158 | A1* | 8/2019 | Lentini | G06V 40/18 |
| 2019/0309977 | A1* | 10/2019 | Burns | F24F 1/0003 |
| 2020/0084211 | A1* | 3/2020 | Wang | H04L 63/0428 |
| 2020/0099694 | A1* | 3/2020 | Weiss | H04L 63/0853 |
| 2020/0364428 | A1* | 11/2020 | Azanza Ladrón | H04N 1/00334 |
| 2021/0056535 | A1* | 2/2021 | Xu | H04W 4/50 |
| 2021/0098096 | A1* | 4/2021 | Gergely | G06F 21/602 |
| 2021/0110061 | A1* | 4/2021 | Sharma | G07F 7/08 |

FOREIGN PATENT DOCUMENTS

| | | |
|---|---|---|
| CN | 104477105 A | 4/2015 |
| CN | 104537109 A | 4/2015 |
| CN | 105069492 | 11/2015 |
| CN | 204946059 | 1/2016 |
| CN | 204965462 | 1/2016 |
| CN | 205581940 | 9/2016 |
| CN | 106327263 A | 1/2017 |
| CN | 106686268 A | 5/2017 |
| CN | 108092881 A | 5/2018 |
| CN | 108229195 A | 6/2018 |

* cited by examiner

SYSTEM AND METHOD FOR INFORMATION INTERACTION

CROSS-REFERENCE TO RELATED APPLICATION

The present application claims the benefit of and priority to Chinese Patent Application No. 201810842610.4 filed Jul. 27, 2018, the entire contents of which are incorporated herein by reference.

TECHNICAL FIELD

The present disclosure relates to the field of vehicle communication technologies and, more particularly, to a system for information interaction and a method for information interaction.

BACKGROUND

With the development of the automobile industry, automobile consumer goods have increasingly entered the lives of ordinary people.

As one of the most important means of transportation, automobiles have become a necessity in daily life, and vehicle-mounted electronic tags serve as a technical means to substitute paper tags. However, existing vehicle-mounted tags have simple functions, have no information interaction function, and cannot be personalized. They merely serve as one-way information publishing interface for vehicle owners. Communication needs to be implemented by telephoning or short messages, thus the operation is cumbersome, user time is greatly wasted, and user experience is poor.

SUMMARY

A system for information interaction is disclosed, which includes: a first terminal, an electronic tag, a second terminal, and an information interaction platform. The electronic tag is configured to present a two-dimensional code. A binding relationship exists between the first terminal and the two-dimensional code. The second terminal is configured to: scan the two-dimensional code, generate login request information, send the login request information to the information interaction platform, wherein the login request information includes identifier information of the second terminal; receive content presentation information corresponding to the two-dimensional code returned by the information interaction platform according to the identifier information, and perform an information interaction with the first terminal according to a communication manner selected by a user from the content presentation information. The information interaction platform is configured to receive the login request information, authorize and authenticate the second terminal according to the identifier information, and send the content presentation information to the second terminal according to the authorization and authentication results.

In an exemplary embodiment, the content presentation information includes authorization information and non-authorization information, and the information interaction platform further includes a memory. The first terminal is further configured to edit the authorization information and the non-authorization information, and send the authorization information and the non-authorization information to the information interaction platform. The information interaction platform is further configured to receive the authorization information and the non-authorization information, and store the authorization information and the non-authorization information in the memory.

In an exemplary embodiment, the electronic tag further includes a memory. The electronic tag is further configured to receive the two-dimensional code and store the two-dimensional code in the memory.

In an exemplary embodiment, the identifier information includes any one of the following: user location identification information, user identity identification information, and real-name authentication identification information. The information interaction platform is further configured to authorize and authenticate the second terminal, according to the identifier information, and send the non-authorization information and the authorization information corresponding to the electronic tag to the second terminal when the authorization and authentication succeed, or send the non-authorization information corresponding to the electronic tag to the second terminal when the authorization and authentication fail.

In an exemplary embodiment, the communication manner includes a message communication manner and a telephone communication manner. When the user selects the message communication manner, the second terminal is further configured to perform information interaction with the first terminal via the information interaction platform. Alternatively, when the user selects the telephone communication manner, the second terminal is further configured to perform information interaction with the first terminal in a form of call.

In an exemplary embodiment, the electronic tag includes a communication module. The first terminal is further configured to communicate with the electronic tag via the communication module. The communication module includes one or more of a Bluetooth module, a WiFi module, a GPRS module, a 3G module, a 4G module, a 5G module, and an NB-IoT module.

In an exemplary embodiment, the electronic tag is provided with a display screen, and the display screen is an electronic ink screen.

In an exemplary embodiment, the first terminal is further configured to edit an updated two-dimensional code, send the updated two-dimensional code to the electronic tag, and establish a binding relationship between the updated two-dimensional code and the information interaction platform.

In an embodiment, the information interaction platform stores a plurality of two-dimensional codes. The first terminal is further configured to select a two-dimensional code from the plurality of two-dimensional codes as an updated two-dimensional code, send the updated two-dimensional code to the electronic tag, and establish a binding relationship between the updated two-dimensional code and the information interaction platform.

A method for information interaction is further disclosed, which includes: scanning, by a second terminal, a two-dimensional code on the electronic tag to generate login request information, wherein the login request information includes identifier information of the second terminal; sending, by the second terminal, the login request information to an information interaction platform; authorizing and authenticating, by the information interaction platform, the second terminal according to the identifier information; obtaining, by the information interaction platform, content presentation information corresponding to the two-dimensional code according to authorization and authentication results, and sending, by the information interaction platform, the content presentation information to the second terminal; and performing, by the second terminal, information interaction with a first terminal bound to the electronic tag according to a communication manner selected by a user from the content presentation information.

In an exemplary embodiment, the content presentation information comprises authorization information and non-authorization information, and the information interaction platform comprises a memory; the first terminal edits the authorization information and the non-authorization information, and sends the authorization information and the non-authorization information to the information interaction platform; and the information interaction platform receives the authorization information and the non-authorization information, and stores the authorization information and the non-authorization information in the memory.

In an exemplary embodiment, the electronic tag comprises a memory; and the electronic tag receives the two-dimensional code, and stores the two-dimensional code in the memory.

In an exemplary embodiment, the identifier information comprises any one of user location identification information, user identity identification information, and real-name authentication identification information; and the information interaction platform authorizes and authenticates the second terminal according to the identifier information, and sends the non-authorization information and the authorization information corresponding to the electronic tag to the second terminal when the authorization and authentication succeed, or sends the non-authorization information corresponding to the electronic tag to the second terminal when the authorization and authentication fail.

In an exemplary embodiment, the communication manner comprises a message communication manner, and the second terminal performs information interaction with the first terminal via the information interaction platform.

In an exemplary embodiment, the communication manner comprises a telephone communication manner, and the second terminal performs information interaction with the first terminal in a form of call.

In an exemplary embodiment, the first terminal edits an updated two-dimensional code, sends the updated two-dimensional code to the electronic tag, and establishes a binding relationship between the updated two-dimensional code and the information interaction platform.

In an exemplary embodiment, the information interaction platform stores a plurality of two-dimensional codes; and the first terminal selects a two-dimensional code from the plurality of two-dimensional codes as an updated two-dimensional code, sends the updated two-dimensional code to the electronic tag, and establishes a binding relationship between the updated two-dimensional code and the information interaction platform.

DETAILED DESCRIPTION

To make the foregoing objectives, features, and advantages of the present disclosure more apparent and clear, the present disclosure is further described in detail below with reference to the accompanying drawings and embodiments.

Figure 1:
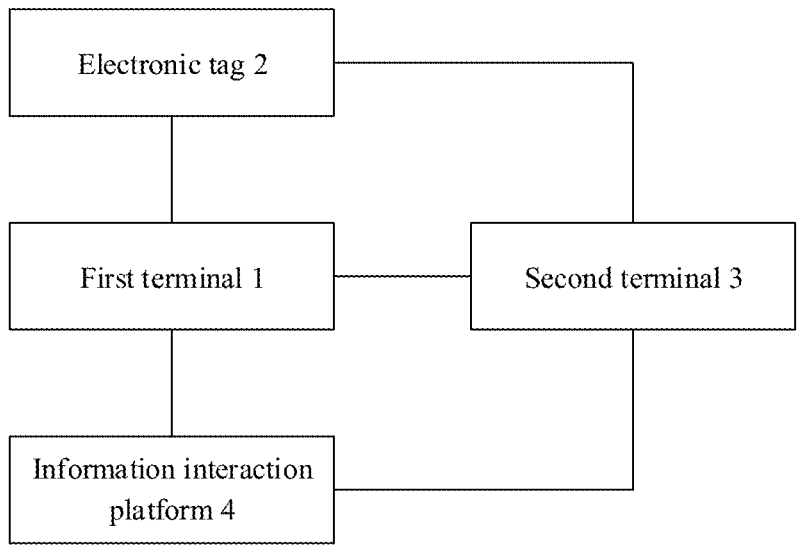
FIG. 1 illustrates a schematic structural diagram of a system for information interaction according to an embodiment of the present disclosure.

Referring to FIG. 1, a schematic structural diagram of a system for information interaction according to an embodiment of the present disclosure, is illustrated. The system for information interaction may include a first terminal 1, an electronic tag 2, a second terminal 3, and an information interaction platform 4.

The electronic tag 2 is configured to present a two-dimensional code.

A binding relationship exists between the first terminal and the two-dimensional code.

The second terminal 3 is configured to: scan the two-dimensional code, generate login request information, and send the login request information to the information interaction platform 4, wherein the login request information includes identifier information of the second terminal 3; receive content presentation information corresponding to the two-dimensional code returned by the information interaction platform 4 according to the identifier information, and perform information interaction with the first terminal 1 according to a communication manner selected by a user from the content presentation information.

The information interaction platform 4 is configured to receive the login request information, authorize and authenticate the second terminal 3 according to the identifier information, and send the content presentation information to the second terminal 3 according to authorization and authentication results.

In this embodiment of the present disclosure, the first terminal 1 and the second terminal 3 may be electronic devices, such as mobile phones, PADs, computers, etc.

A binding relationship is pre-established between the first terminal 1 and the two-dimensional code on the electronic tag 2. The electronic tag 2 is internally provided, in advance, with a communication module. The communication module may include one or more of a Bluetooth module, a WiFi module, a GPRS module, a 3G module, a 4G module, a 5G module, and an NB-IoT module, but the embodiments of the present disclosure are not limited thereto. In this embodiment of the present disclosure, the communication module is a low power consumption Bluetooth (BLE) module.

It may be understood that the electronic tag 2 may be a either a vehicle-mounted electronic tag or an electronic tag in other forms, but the embodiments of the present disclosure are not limited thereto.

After the binding relationship is established between the first terminal 1 and the two-dimensional code, the electronic tag 2 may perform information interaction with the first terminal 1 via the built-in communication module, and the first terminal 1 may edit the content presentation information and send the content presentation information to the electronic tag 2 via the communication module, which is specifically described in detail with reference to FIG. 2.

Figure 2:
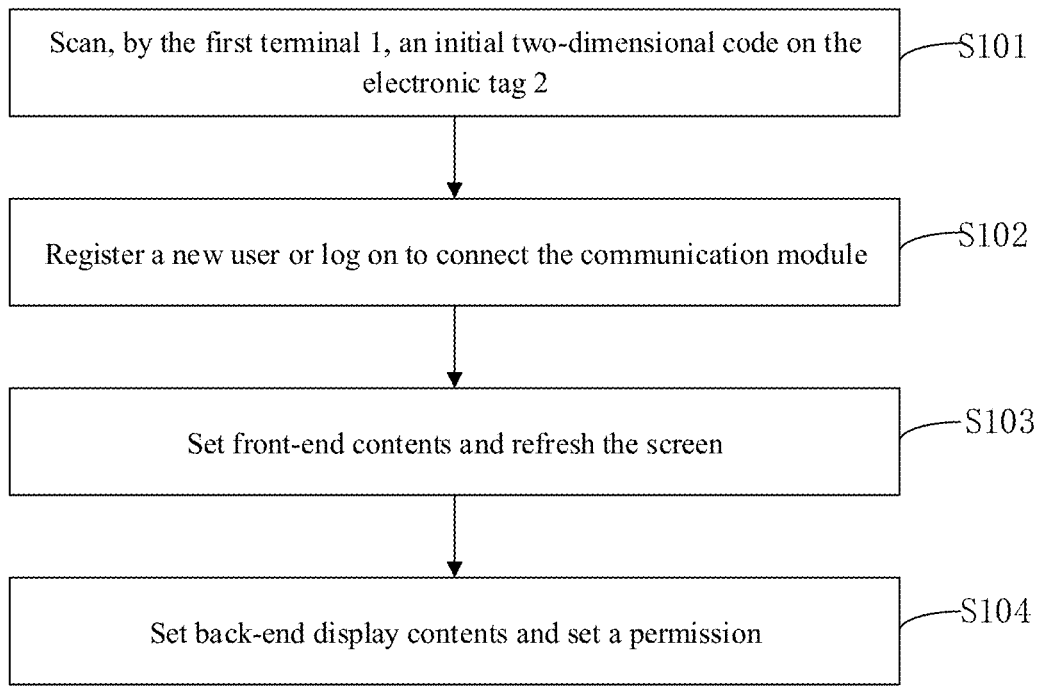
FIG. 2 illustrates a flowchart of steps of setting display contents of an electronic tag according to an embodiment of the present disclosure.

Referring to FIG. 2, a flowchart of steps of setting display contents of an electronic tag, according to an embodiment of the present disclosure, is illustrated.

In Step S101, the first terminal 1 scans an initial two-dimensional code on the electronic tag 2.

In this embodiment of the present disclosure, an initial two-dimensional code may be preset on the display screen of the electronic tag 2, wherein the initial two-dimensional code corresponds to a corresponding web page. The first terminal 1 may jump to the page corresponding to the initial two-dimensional code after the initial two-dimensional code is scanned, and then Step S102 is performed.

Step S102: registering a new user or logging on to connect the communication module.

When the first terminal 1 is a registered user, the user of the first terminal 1 may directly enter the page corresponding to the user and edit corresponding contents in this page, for example, a two-dimensional code or user contact information, etc.

When the first terminal 1 is a new user, the user of the first terminal 1 may register to bind with the electronic tag 2 and, then, may establish a communication connection with the communication module arranged in the electronic tag 2 to implement information interaction between the first terminal 1 and the electronic tag 2.

After the communication module is connected, Step S103 is performed.

Step S103: Setting front-end contents and refreshing the screen.

After the first terminal 1 is connected to the communication module (such as the WIFI module, GPRS module, etc.) and arranged in the electronic tag 2 to establish the communication connection, the first terminal 1 may edit, in the page corresponding to the initial two-dimensional code, contents (i.e., the front-end contents) displayed on a display screen of the electronic tag 2, for example, texts, pictures, two-dimensional codes, website telephone numbers, etc. Next, the front-end display contents are sent to the electronic tag 2 by the communication module.

After the first terminal 1 edits the two-dimensional code, the two-dimensional code may be sent to the electronic tag 2, such that the electronic tag 2 may replace the originally presented initial two-dimensional code with this original two-dimensional code to update the two-dimensional code.

Step S104: setting back-end display contents and setting a permission.

The user of the first terminal 1 may edit the back-end display contents in the page corresponding to the initial two-dimensional code, and set the permission for the back-end display contents, such as location authorization, real identity authorization, and the like, on which the embodiments of the present disclosure impose no restriction.

After the back-end display contents are set, the back-end display contents may be sent to the information interaction platform 4 and stored in the memory of the information interaction platform 4.

The dynamic update of the two-dimensional code on the electronic tag 2 may be performed in the following two ways.

The first way, the first terminal 1 edits the updated two-dimensional code, and sends the updated two-dimensional code to the electronic tag 2 to establish a binding relationship between the updated two-dimensional code and the information interaction platform.

In this embodiment of the present disclosure, the first terminal 1 may edit the updated two-dimensional code, send the updated two-dimensional code to the electronic tag 2, and save the updated two-dimensional code into the memory arranged in the electronic tag 2, such that a two-dimensional code on the electronic ink screen of the electronic tag 2 may be replaced by the updated two-dimensional code to update the two-dimensional code. Next, the first terminal 1 also may establish the binding relationship between the updated two-dimensional code and the information interaction platform 4, such that the content presentation information corresponding to the two-dimensional code may be stored on the information interaction platform 4.

The second way, a plurality of two-dimensional codes are stored on the information interaction platform 4. The first terminal 1 is further configured to select a two-dimensional code from the plurality of two-dimensional codes as the updated two-dimensional code, send the updated two-dimensional code to the electronic tag 2, and establish a binding relationship between the updated two-dimensional code and the information interaction platform 4.

In this embodiment of the present disclosure, a plurality of two-dimensional codes are stored on the information interaction platform 4. The first terminal 1 may select a two-dimensional code from the plurality of two-dimensional codes as the updated two-dimensional code, and send the updated two-dimensional code to the electronic tag 2, such that a two-dimensional code on the display screen of the electronic tag 2 is updated with the updated two-dimensional code to complete the update of the two-dimensional code. Furthermore, the first terminal 1 also may establish the binding relationship between the updated two-dimensional code and the information interaction platform 4. Thus, the content presentation information corresponding to the two-dimensional code may be stored in the information interaction platform 4.

In practical application, those skilled in the art also may dynamically update the two-dimensional codes on the electronic tag 2 in other ways, which is not limited in the embodiments of the present disclosure.

Figure 3:
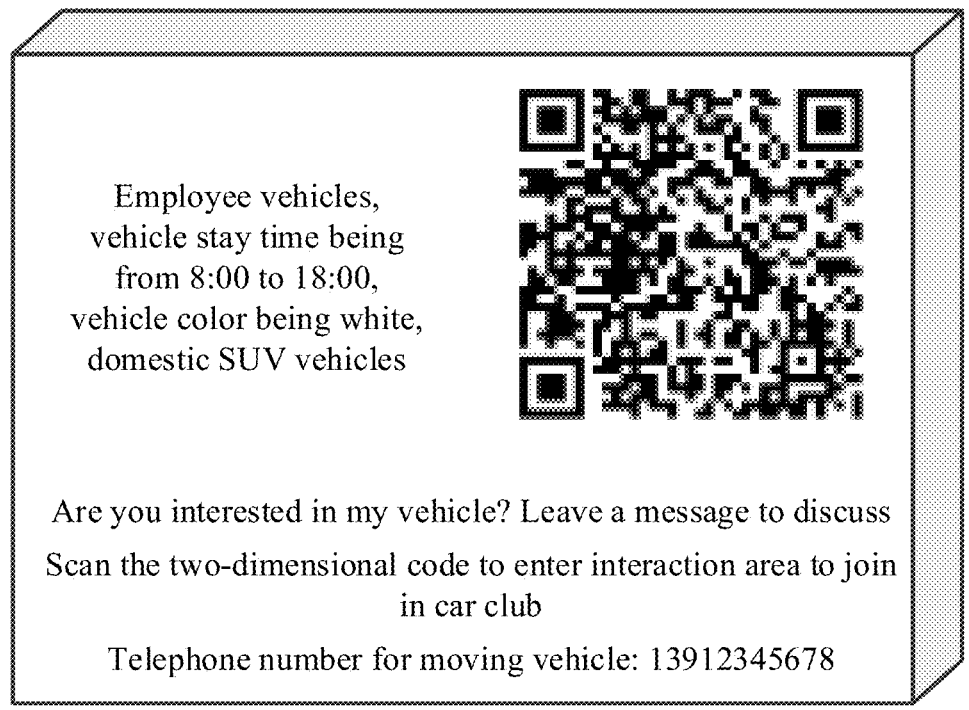
FIG. 3 illustrates a schematic diagram of contents displayed by a display screen of an electronic tag according to an embodiment of the present disclosure.

In a preferred embodiment of the present disclosure, the display screen may be an electronic ink screen, through which the front-end contents may be displayed. Referring to FIG. 3, a schematic diagram of contents displayed by a display screen of an electronic tag according to an embodiment of the present disclosure is illustrated. As shown in FIG. 3, the front-end contents displayed on the electronic ink screen may include at least one of the following: texts, telephone numbers, pictures, and two-dimensional codes. Texts, web addresses, phone numbers, pictures, and other information are visually displayed to other people, for example, contents as shown in FIG. 3: employee vehicles, vehicle stay time being from 8:00 to 18:00, vehicle color being white, domestic SUV vehicles, telephone number for moving vehicle: 13912345678, and two-dimensional codes, etc.

The electronic tag 2 may establish a binding relationship with the information interaction platform 4 through a two-dimensional code. Other personnel may enter back-end service by scanning the two-dimensional code, wherein the back-end service may be a webpage, which may display texts, personal business cards, interlinkage, telephone transfer, voice messages, message boards, and other information to provide one or more technical services.

In the present disclosure, the display screen of the electronic tag 2 is an electronic ink screen, which can hold screen display contents after the electronic ink screen is turned off, to serve as information outputted by a display module.

The structure of the electronic tag 2 is described in detail below with reference to FIG. 4.

Figure 4:
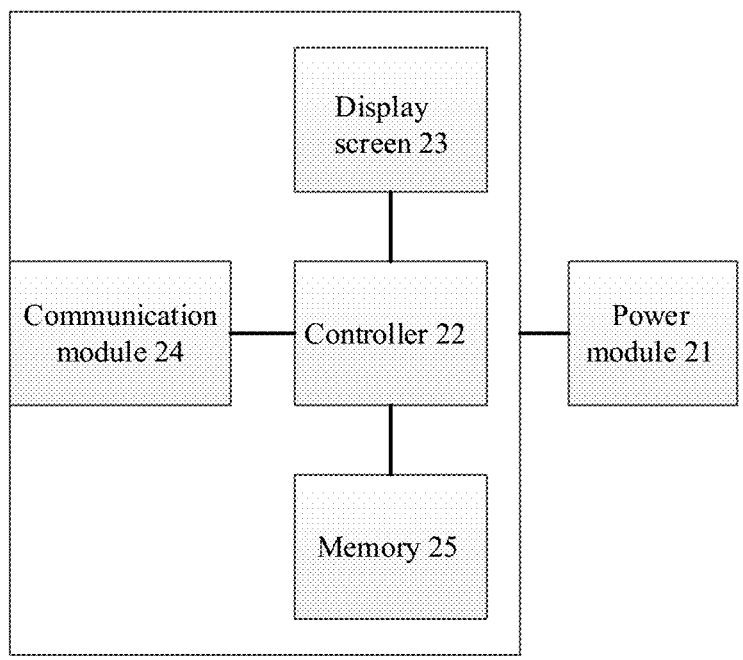
FIG. 4 illustrates a schematic structural diagram of an electronic tag according to an embodiment of the present disclosure.

Referring to FIG. 4, a schematic structural diagram of an electronic tag, according to an embodiment of the present disclosure, is illustrated. As shown in FIG. 4, the electronic tag 2 may include a power module 21, a controller 22, a display screen 23, a communication module 24, and a memory 25. The power module 21 may be configured to provide electric energy to the display screen and the communication module. A vehicle-mounted battery may be used as the power module, and/or another power supply device may be used as the power module, which is not limited in the embodiments of the present disclosure.

As a control center of the electronic tag 2, the controller 22 is configured to control logic, process data, and control various functional modules. For example, the controller 22 may be configured to control the operation of the communication module and the power module.

The controller 22 may be a low-power controller, which may reduce electric energy consumption of the electronic tag 2, and may further save electric energy consumed by the electronic tag 2 during operation.

The memory 25 may also be disposed on the electronic tag 2, and the memory 25 may be configured to store display data of the electronic ink screen, setting information of the first terminal 1, a two-dimensional code, and user information corresponding to the first terminal 1, etc.

Figure 5:
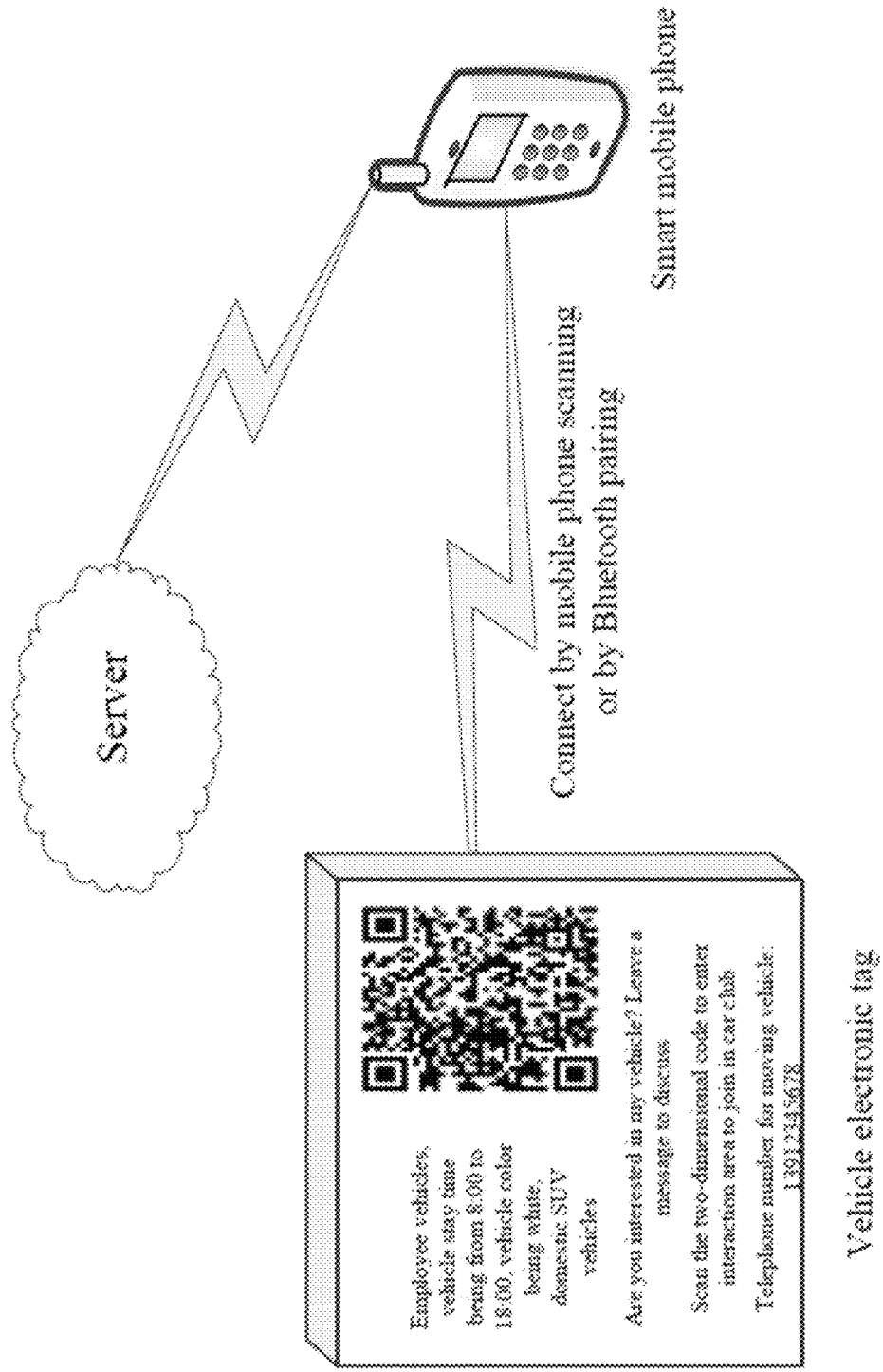
FIG. 5 illustrates a schematic structural diagram of scanning, by a terminal, a two-dimensional code on the electronic tag to interact with a server according to an embodiment of the present disclosure.

The second terminal 3 may scan the two-dimensional code displayed on the electronic tag 2 to generate login request information, and send the login request information to the information interaction platform 4, wherein the login request information includes identifier information of the second terminal 3. For example, referring to FIG. 5, a schematic structural diagram of scanning, by a terminal, a two-dimensional code on the electronic tag to interact with a server according to an embodiment of the present disclosure is illustrated. As shown in FIG. 5, the second terminal 3 may be a mobile phone, wherein the mobile phone may carry out information interaction with a background server by scanning the two-dimensional code on the electronic tag 2 and may jump to the web page corresponding to the two-dimensional code.

The information interaction platform 4 may receive the login request information sent by the second terminal 3 and authorize and authenticate the second terminal 3 according to the identifier information in the login request information. The permission setting may include geographic location, gender, age, time, and whether a user is registered with a real name, or a reply to a question from a vehicle owner, etc.

For example, the authorization and authentication may be determined in combination with location information of a vehicle to which the first terminal 1 belongs. When the vehicle is parked in a residential compound of the vehicle owner and the second terminal 3 scans the two-dimensional code to enter an information interaction service, it is required to provide geographical location authorization of a mobile phone. When it is determined that the current location is within the residential compound, the second terminal 3 may be identified to be near the vehicle, and a part of privacy contents (for example, the room number of the vehicle owner) may be displayed according to settings, such that it is avoidable that the vehicle owner cannot timely view messages or answer the telephones, and the vehicle owner can be reminded. In another example, when the vehicle is parked at a work unit, a work number and a station of an employee may be displayed, such that the vehicle owner may be timely contacted through an internal communication system, which is especially important in some locations where cellular signals are shielded for special reasons. In another example, when the vehicle owner drives the vehicle to visit a client, the name of the client may be displayed according to settings, such that the vehicle owner is notified in time. The determination in combination with location may filter some false vehicle-moving needs, and information such as time and place when/where the second terminal 3 enters the information interaction may be known.

In addition, for the authorization and authentication, different contents may also be displayed according to feature information of the user corresponding to the second terminal 3, for example, gender and age of the user, such as gender and age in WeChat authorization information, different contents displayed for different ages and genders, adding more interesting contents, such as adding contents on appearance and interior trim for women, or adding contents on safety, maneuverability, and cross-country performance for men.

In addition, the update of the displayed contents and the determination of the authorized contents may also prevent reception of harassment information. Since a two-dimensional code obtained by printing is fixed, the two-dimensional code is always valid when other people store it by taking pictures and, thus, a hidden danger of harassment exists. Display of the electronic tag of the present disclosure is personalized, and the electronic tag is updatable. Thus, the two-dimensional code may be updated in accordance with a fixed cycle. For example, the two-dimensional code is automatically updated once a week or the two-dimensional code is manually updated. Therefore, the two-dimensional code has a certain timeliness, which avoids the risk of being harassed for a long time because the two-dimensional code is stored by taking pictures by someone unknown.

It is to be understood that the above examples are merely examples for better understanding the technical solutions of the present disclosure, and are not intended to be the only limitation on the embodiments of the present disclosure.

Figure 6:
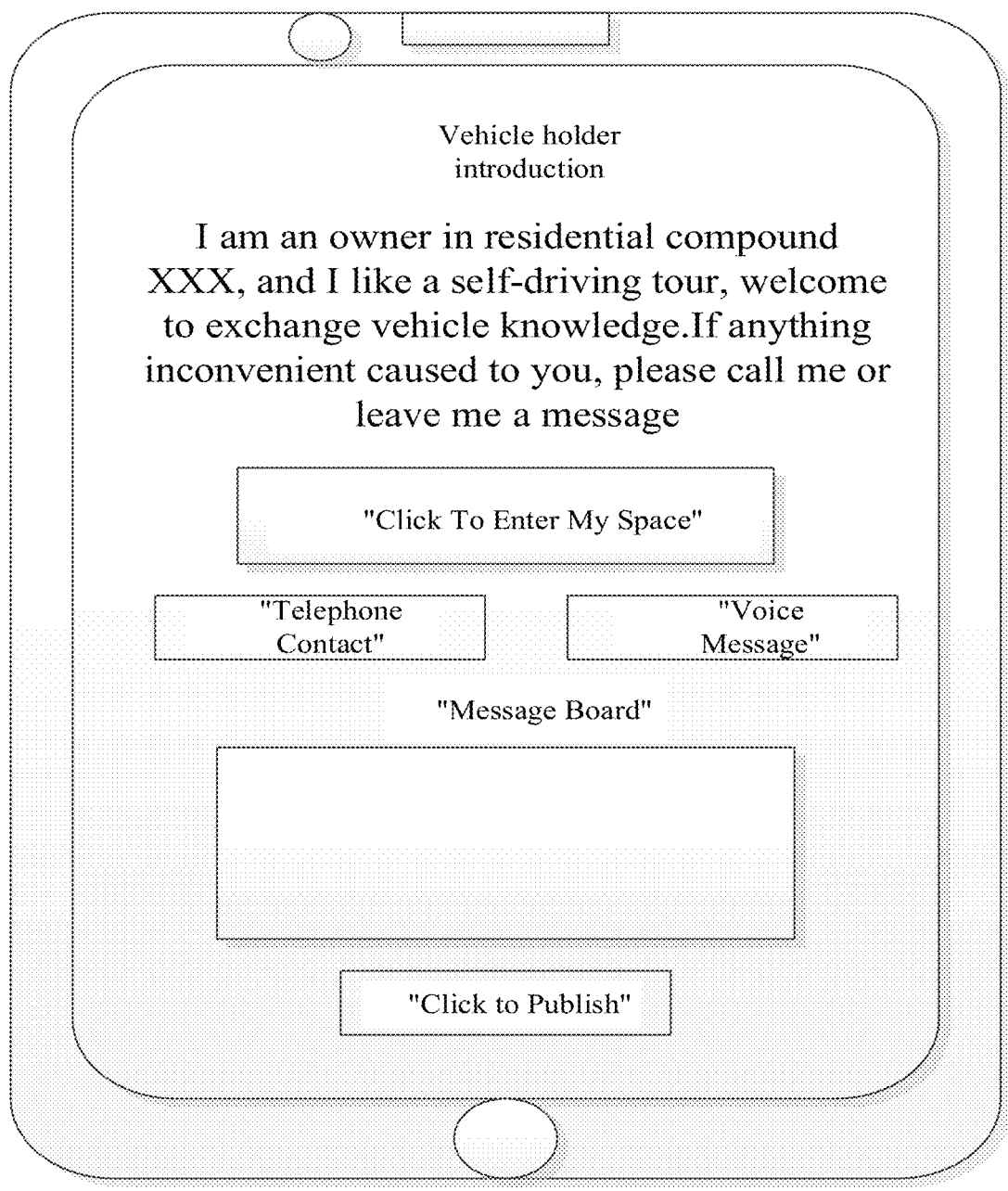
FIG. 6 illustrates a schematic diagram of back-end display according to an embodiment of the present disclosure.

In some embodiments of the present disclosure, the two-dimensional code on the electronic tag 2 has a corresponding page on the information interaction platform 4, and after the second terminal 3 scans the two-dimensional code, it may jump or navigate to this page. For example, referring to FIG. 6, a schematic diagram of back-end display according to an embodiment of the present disclosure is illustrated. As shown in FIG. 6, buttons such as "Click To Enter My Space", "Telephone Contact", "Voice Message", "Message Board", and "Click to Publish" are preset in the back-end display page corresponding to the two-dimensional code. If the second terminal is an authorized user, the user of the second terminal clicks the button "Click To Enter My Space" to jump to another page. Non-authorization information is displayed on the other page for viewing by the user of the second terminal. When the second terminal is an unauthorized user, and the user of the second terminal clicks the button "Click To Enter My Space", the user may be prompted with "No Viewing Permission" or "Error" to prevent the user from viewing the non-authorization information. Moreover, from the "Telephone Contact", "Voice Message", "Message Board" in this page, the user of the second terminal may select one according to the user's preference to perform information interaction with the user of the first terminal. For example, when the user clicks the button "Telephone Contact", the user may directly jump or navigate to a dialing interface to dial a telephone number of the user of the first terminal, so as to implement the communication between the first terminal and the second terminal in the form of call. When the user clicks the button "Voice Message", it may jump or navigate to a voice chat interface such as WeChat or QQ, such that the voice communication between the user of the first terminal and the user of the second terminal may be implemented. The user of the second terminal may also input texts required for communicating with the user of the first terminal into an input box under the "Message Board." By clicking the button "Click to Publish," the texts in the input box may be sent to the first terminal through the information interaction platform, such that the user of the first terminal may view the texts and return reply information via a corresponding APP (e.g., computer application). In this regard, the communication between the user of the first terminal and the user of the second terminal is implemented.

Specifically, the content presentation information may include authorization information and non-authorization information. The first terminal 1 may also be configured to edit the authorization information and the non-authorization information, and send the authorization information and the non-authorization information to the electronic tag 2. The electronic tag 2 may receive the authorization information and the non-authorization information, and store the authorization information and the non-authorization information in the memory 25.

The identifier information may include one or more of the user location identification information, user identity identification information, and real-name authentication identification information or the like, which are not limited by the embodiments of the present disclosure.

The information interaction platform 4 may authorize and authenticate the second terminal 3, according to the identifier information, and may send both the non-authorization information and the authorization information corresponding to the electronic tag 2 to the second terminal 3 when the authorization and authentication succeed. The non-authorization information corresponding to the electronic tag 2 may be sent to the second terminal 3 when the authorization and authentication fail.

The second terminal 3 may receive the content presentation information corresponding to the electronic tag 2 that is returned by the information interaction platform 4 according to the identifier information, wherein the content presentation information includes one or more communication manners. The communication manners may include a message communication manner and a telephone communication manner, wherein the message communication manner may include a language message manner or a text message manner, etc. Contact information of the user corresponding to the first terminal 1 may also be reserved in the content presentation information, and the user of the second terminal 3 may communicate with the user of the first terminal 1 by telephone.

In specific implementation, those skilled in the art may also adopt other communication manners according to actual needs, which are not limited by the embodiments of the present disclosure.

When the user selects the message communication manner, the second terminal 3 may perform information interaction with the first terminal 1 through the information interaction platform 4. Specifically, the user of the second terminal 3 may save message information in the information interaction platform 4 by way of message, and the information interaction platform 4 may send the message information to the first terminal 1, such that the first terminal 1 receives the message information and performs information communication with the second terminal 3.

When the user selects the telephone communication manner, the second terminal 3 may directly perform information interaction with the first terminal 1 in a form of call.

According to the system for information interaction provided by the embodiments of the present disclosure, a second terminal scans a two-dimensional code on the electronic tag to generate login request information, wherein the login request information includes identifier information of the second terminal. The second terminal sends the login request information to an information interaction platform. The information interaction platform authorizes and authenticates the second terminal according to the identifier information, obtains content presentation information corresponding to the two-dimensional code according to authorization and authentication results, and sends the content presentation information to the second terminal. The second terminal performs information interaction with a first terminal bound to the electronic tag according to a communication manner selected by a user from the content presentation information. According to the embodiments of the present disclosure, information interaction between terminals may be implemented via the electronic tag. Compared with existing technical solutions, the operation is simpler, time is greatly saved for the user, and user experience is improved for the end user.

Figure 7:
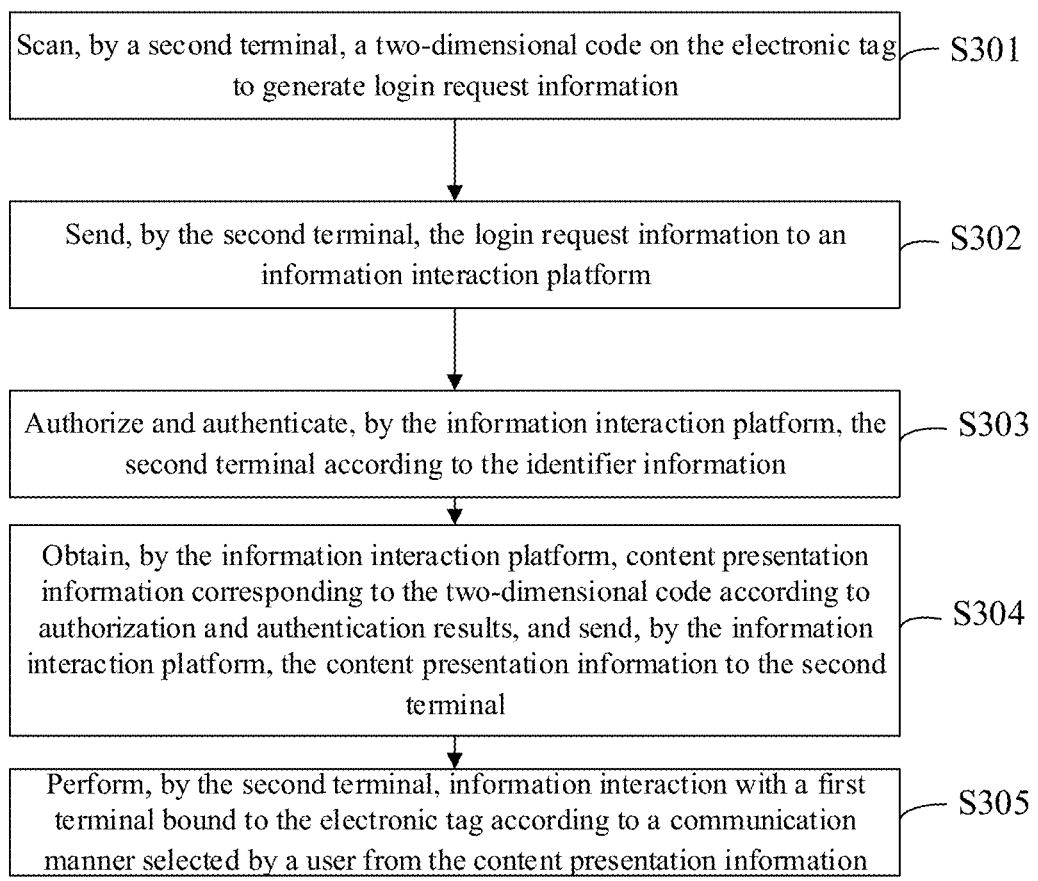
FIG. 7 illustrates a flowchart of steps of a method for information interaction according to an embodiment of the present disclosure.

Referring to FIG. 7, a flowchart of steps of a method for information interaction according to an embodiment of the present disclosure is illustrated. The method for information interaction may include following steps.

Step S301: scanning, by a second terminal, a two-dimensional code on the electronic tag to generate login request information.

In some embodiments of the present disclosure, the second terminal may be electronic devices, such as mobile phones, PADs, tablet computing devices, computers, etc.

A two-dimensional code is preset on the display screen of the electronic tag, wherein the two-dimensional code may be bound with a corresponding back-end service web page on the information interaction platform. The user of the second terminal may scan the two-dimensional code using the second terminal to generate login request information. The login request information may include identifier information of the second terminal, wherein the identifier information may be a location identifier of the second terminal, or a user identity identifier of the second terminal, and the like, which is not limited in the embodiments of the present disclosure.

After the login request information is generated, Step S302 is performed.

Step S302: sending, by the second terminal, the login request information to an information interaction platform.

After the login request information is generated, the second terminal may send the login request information to the information interaction platform, and perform Step S303.

Step S303: authorizing and authenticating, by the information interaction platform, the second terminal according to the identifier information.

After receiving the login request information sent by the second terminal, the information interaction platform may authorize and authenticate the second terminal according to the identifier information in the login request information. For example, the authorization and authentication may be determined in combination with location information of a vehicle to which the first terminal belongs. When the vehicle is parked in a residential compound of the vehicle owner and the second terminal scans the two-dimensional code to enter an information interaction service, it is required to provide geographical location authorization of a mobile phone. When it is determined that the current location is within the residential compound, the second terminal may be identified to be near the vehicle, and a part of privacy contents (for example, the room number of the vehicle owner) may be displayed according to settings, such that it is avoidable that the vehicle owner cannot timely view messages or answer the telephone, and the vehicle owner can be reminded. In another example, when the vehicle is parked at a work unit, a work number and a station of an employee may be displayed, such that the vehicle owner may be timely contacted through an internal communication system, which is especially important in some locations where cellular signals are shielded for special reasons. In another example, when the vehicle owner drives the vehicle to visit a client, the name of the client may be displayed according to settings, such that the vehicle owner is notified in time. The determination in combination with location may filter some false vehicle-moving needs, and information such as time and place when/where the second terminal enters the information interaction may be known.

In addition, for the authorization and authentication, different content may also be displayed according to feature information of the user corresponding to the second terminal, for example, gender and age of the user, such as gender and age in WeChat authorization information, different contents displayed for different ages and genders, adding more interesting contents, such as adding contents on appearance and interior trim for women, or adding contents on safety, maneuverability and cross-country performance for men.

After the authorization and authentication are performed, Step S304 is performed.

Step S304: obtaining, by the information interaction platform, content presentation information corresponding to the two-dimensional code according to authorization and authentication results, and sending, by the information interaction platform, the content presentation information to the second terminal.

Content presentation information such as authorization information and non-authorization information corresponding to different authorization and authentication results of the two-dimensional code is preset at the information interaction platform. When the authorization and authentication succeed, both the non-authorization information and the authorization information corresponding to the two-dimensional code may be sent to the second terminal. When the authorization and authentication fail, the non-authorization information corresponding to the two-dimensional code may be sent to the second terminal.

After the content presentation information is sent to the second terminal, Step 305 is performed.

Step S305: performing, by the second terminal, information interaction with a first terminal bound to the electronic tag according to a communication manner selected by a user from the content presentation information.

The content presentation information includes a communication manner, for example, a message communication manner and a telephone communication manner, etc.

The user of the second terminal may select a corresponding communication manner from the content presentation information according to the user's preference, to perform information interaction with the first terminal bound to the electronic tag.

When the user selects the message communication manner, the second terminal may perform information interaction with the first terminal via the information interaction platform. Specifically, the user of the second terminal may save message information into the information interaction platform by way of message, and the information interaction platform may send the message information to the first terminal, such that the first terminal receives the message information and performs information communication with the second terminal.

When the user selects the telephone communication manner, the second terminal may directly perform information interaction with the first terminal in a form of call.

In specific implementation, those skilled in the art may also adopt other communication manners according to the actual need, which are not limited by the embodiments of the present disclosure.

According to the method for information interaction provided by the embodiments of the present disclosure, a second terminal scans a two-dimensional code on the electronic tag to generate login request information, wherein the login request information includes identifier information of the second terminal. The second terminal sends the login request information to an information interaction platform. The information interaction platform authorizes and authenticates the second terminal according to the identifier information, obtains content presentation information corresponding to the two-dimensional code according to authorization and authentication results, and sends the content presentation information to the second terminal. The second terminal performs information interaction with a first terminal bound to the electronic tag according to a communication manner selected by a user from the content presentation information. According to the embodiments of the present disclosure, information interaction between terminals may be implemented via the electronic tag. Compared with existing technical solutions, the operation is simpler, time is greatly saved for the user, and user experience is improved for the end user.

As a brief description, the foregoing method embodiments are described as a combination of a series of steps or actions. However, those skilled in the art should know that the present disclosure is not limited by sequences of the steps or actions described. This is because some steps may be performed by using other sequences or be performed simultaneously in accordance with the present disclosure. In addition, those skilled in the art should also learn that the embodiments described in the specification are example embodiments, and involve steps, actions, and modules that are not necessarily required for the present disclosure.

The embodiments in the specification are described in a progressive manner. Each embodiment is focused on difference from other embodiments. Cross references is available for identical or similar parts among different embodiments.

Finally it should be explained that a relational term (such as a first or a second . . . ) is merely intended to separate one entity or operation from another entity or operation instead of requiring or hinting any practical relation or sequence exists among these entities or operations. Furthermore, terms such as "comprise", "include" or other variants thereof are intended to cover a non-exclusive "comprise" so that a process, a method, a merchandise or a device comprising a series of elements not only includes these elements, but also includes other elements not listed explicitly, or also includes inherent elements of the process, the method, the merchandise or the device. In the case of no more restrictions, elements restricted by a sentence "include a . . . " do not exclude the fact that additional identical elements may exist in a process, a method, a merchandise, or a device of these elements.

A system for information interaction and a method for information interaction provided by the present disclosure are described above in detail, principles and implementations of the present disclosure are set forth by using specific examples herein, and the description of the foregoing embodiments is merely intended to assist in understanding the method of the present disclosure and the core concept thereof. Also, those of ordinary skill in the art may change, in according with the concept of the present disclosure, a concrete implementation, and a scope of application. In conclusion, contents of the specification shall be not interpreted as limiting the present disclosure.

What is claimed is:

1. A system for information interaction, comprising:
    a first terminal, an electronic tag and an information interaction platform comprising memory, wherein the electronic tag is configured to present a two-dimensional code, wherein a binding relationship exists between the first terminal and the two-dimensional code;
    a second terminal configured to:
        scan the two-dimensional code, generate login request information, send the login request information to the information interaction platform, the login request information comprising identifier information of the second terminal, the identifier information comprising location information of the second terminal; and
        receive content presentation information corresponding to the two-dimensional code returned by the information interaction platform according to the identifier information, and perform information interaction with the first terminal according to a communication manner selected from the content presentation information, the content presentation information comprising authorization information and non-authorization information; and wherein:
    the information interaction platform is configured to receive the login request information, authorize and authenticate the second terminal according to the identifier information, and send the content presentation information to the second terminal according to authorization and authentication results;
    the first terminal is configured to edit the authorization information and the non-authorization information, and send the authorization information and the non-authorization information to the information interaction platform;
    the information interaction platform is configured to receive the authorization information and the non-authorization information, and store the authorization information and the non-authorization information in the memory; and
    the information interaction platform is further configured to authorize and authenticate the second terminal according to a comparison between the location information of the second terminal and location information of the electronic tag.

2. The system for information interaction according to claim 1, wherein:
    the electronic tag further comprises a memory; and
    the electronic tag is configured to receive the two-dimensional code, and store the two-dimensional code in the memory.

3. The system for information interaction according to claim 1, wherein:
    the information interaction platform is further configured to send the non-authorization information and the authorization information corresponding to the electronic tag to the second terminal when the authorization and authentication succeed, or send the non-authorization information corresponding to the electronic tag to the second terminal when the authorization and authentication fail.

4. The system for information interaction according to claim 1, wherein the communication manner comprises a message communication manner, and the second terminal is configured to perform the information interaction with the first terminal via the information interaction platform.

5. The system for information interaction according to claim 1, wherein the communication manner comprises a telephone communication manner, and the second terminal is further configured to perform the information interaction with the first terminal in a form of call.

6. The system for information interaction according to claim 1, wherein:
    the electronic tag comprises a communication module;
    the first terminal is configured to communicate with the electronic tag via the communication module; and
    the communication module comprises one or more of: a Bluetooth module, a WiFi module, a GPRS module, a 3G module, a 4G module, a 5G module, and an NB-IoT module.

7. The system for information interaction according to claim 1, wherein the electronic tag is provided with a display screen, and the display screen is an electronic ink screen.

8. The system for information interaction according to claim 6, wherein the first terminal is further configured to edit an updated two-dimensional code, send the updated two-dimensional code to the electronic tag, and establish a binding relationship between the updated two-dimensional code and the information interaction platform.

9. The system for information interaction according to claim 7, wherein the first terminal is further configured to edit an updated two-dimensional code, send the updated two-dimensional code to the electronic tag, and establish a binding relationship between the updated two-dimensional code and the information interaction platform.

10. The system for information interaction according to claim 6, wherein:
    the information interaction platform stores a plurality of two-dimensional codes; and
    the first terminal is further configured to select a two-dimensional code from the plurality of two-dimensional codes as an updated two-dimensional code, send the updated two-dimensional code to the electronic tag, and establish a binding relationship between the updated two-dimensional code and the information interaction platform.

11. The system for information interaction according to claim 7, wherein:
    the information interaction platform stores a plurality of two-dimensional codes; and
    the first terminal is further configured to select a two-dimensional code from the plurality of two-dimensional codes as an updated two-dimensional code, send the updated two-dimensional code to the electronic tag, and establish a binding relationship between the updated two-dimensional code and the information interaction platform.

12. The system for information interaction according to claim 1, wherein the comparison between location information of the second terminal and location information of the electronic tag indicates that a distance between the second terminal and the electronic tag is smaller than or equal to a threshold value.

13. A method for information interaction, comprising:
presenting a two-dimensional code on an electronic tag;
binding the two-dimensional code with a first terminal;
scanning, by a second terminal, the two-dimensional code on the electronic tag to generate login request information, wherein the login request information comprises identifier information of the second terminal, the identifier information comprising location information of the second terminal;
sending, by the second terminal, the login request information to an information interaction platform, the information interaction platform comprising memory;
authorizing and authenticating, by the information interaction platform, the second terminal according to the identifier information;
obtaining, by the information interaction platform, content presentation information corresponding to the two-dimensional code according to authorization and authentication results, and sending, by the information interaction platform, the content presentation information to the second terminal, the content presentation information comprising authorization information and non-authorization information;
performing, by the second terminal, an information interaction with the first terminal bound to the two-dimensional code according to a communication manner selected by a user from the content presentation information;
editing, by the first terminal, the authorization information and the non-authorization information, and sending, by the first terminal, the authorization information and the non-authorization information to the information interaction platform;
receiving, by the information interaction platform, the authorization information and the non-authorization information, and storing, by the information interaction platform, the authorization information and the non-authorization information in the memory; and
authorizing and authenticating, by the information interaction platform, the second terminal according to a comparison between the location information of the second terminal and location information of the electronic tag.

14. The method for information interaction according to claim 13, wherein:
the electronic tag comprises a memory; and
the electronic tag receives the two-dimensional code, and stores the two-dimensional code in the memory.

15. The method for information interaction according to claim 13, wherein:
the information interaction platform authorizes and authenticates the second terminal according to the identifier information, and sends the non-authorization information and the authorization information corresponding to the electronic tag to the second terminal when the authorization and authentication succeed, or sends the non-authorization information corresponding to the electronic tag to the second terminal when the authorization and authentication fail.

16. The method for information interaction according to claim 13, wherein the communication manner comprises a message communication manner, and the second terminal performs the information interaction with the first terminal via the information interaction platform.

17. The method for information interaction according to claim 13, wherein the communication manner comprises a telephone communication manner, and the second terminal performs the information interaction with the first terminal in a form of call.

18. The method for information interaction according to claim 13, wherein the first terminal edits an updated two-dimensional code, sends the updated two-dimensional code to the electronic tag, and establishes a binding relationship between the updated two-dimensional code and the information interaction platform.

19. The method for information interaction according to claim 18, wherein:
the information interaction platform stores a plurality of two-dimensional codes; and
the first terminal selects a two-dimensional code from the plurality of two-dimensional codes as an updated two-dimensional code, sends the updated two-dimensional code to the electronic tag, and establishes the binding relationship between the updated two-dimensional code and the information interaction platform.

20. The method for information interaction according to claim 13, wherein the comparison between location information of the second terminal and location information of the electronic tag indicates that a distance between the second terminal and the electronic tag is smaller than or equal to a threshold value.

\* \* \* \* \*